United States Patent Office 3,368,966
Patented Feb. 13, 1968

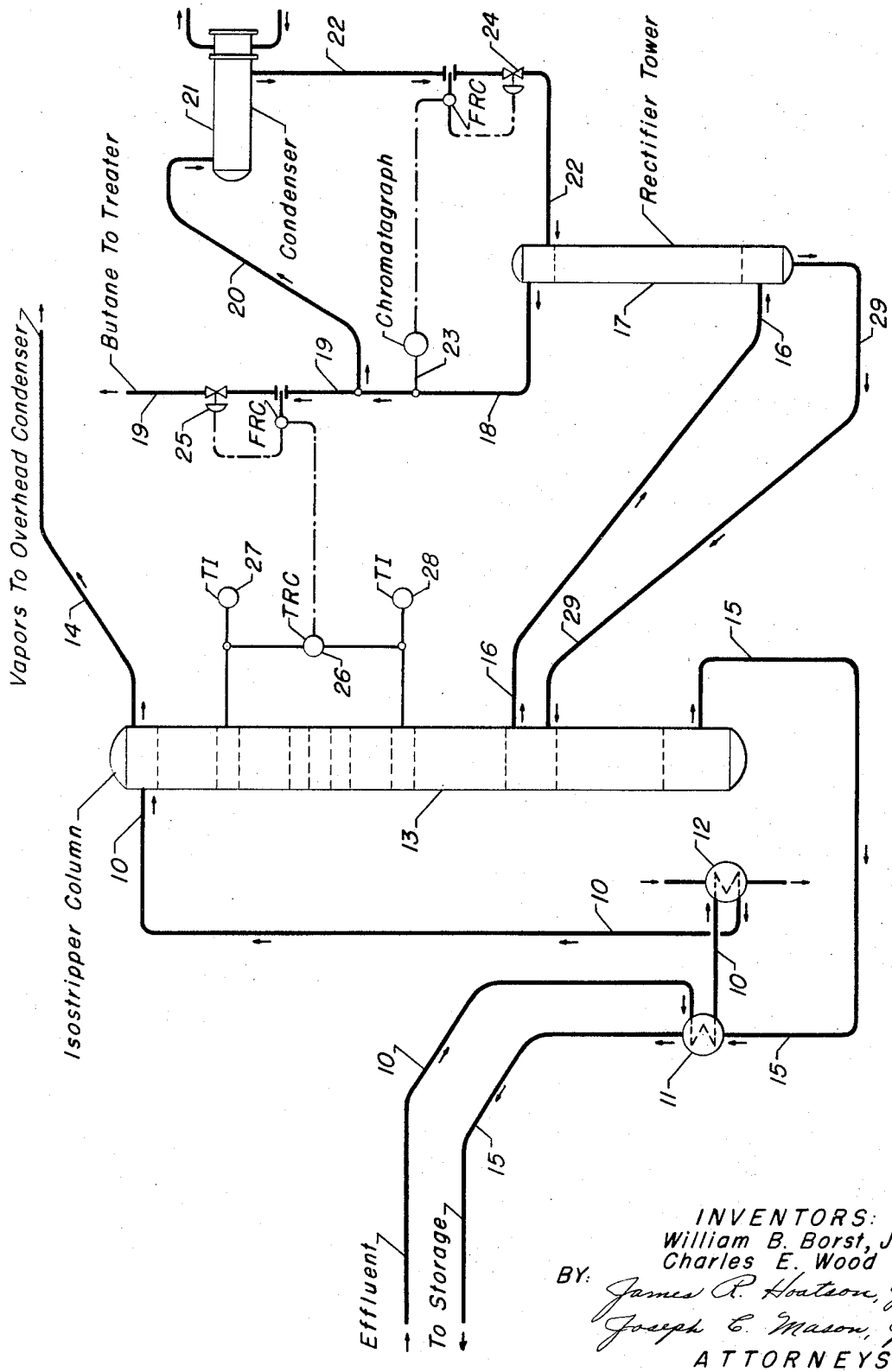

3,368,966
CONTROL OF ISOBUTANE FRACTIONATING COLUMN
William B. Borst, Jr., and Charles E. Wood, Mount Prospect, Ill., assignors to Universal Oil Products Company, Des Plaines, Ill., a corporation of Delaware
Filed Dec. 27, 1966, Ser. No. 604,883
5 Claims. (Cl. 208—351)

This invention relates to fractionation of close-boiling hydrocarbon components. It particularly relates to a control system for fractional distillation towers. It specifically relates to a method for separating a hydrocarbon feed mixture containing $C_3$ hydrocarbons, isbutane, n-butane, and heavier boiling hydrocarbons by fractionation means and to the control thereof.

The recovery of normally gaseous hydrocarbons from hydrocarbon fractions has become increasingly important and has constituted a major refinery operation. The importance of these light hydrocarbons is due to the development of polymerization and alkylation processes for converting the lighter materials to high octane components. Also, the use of liquefied petroleum gas, such as propane and butane as fuel, has sharply increased, and light olefins, such as ethylene, propylene and butylene, have become the foundation of a rapidly expanding petrochemical industry.

In the processing of these normally gaseous hydrocarbons it is necessary to fractionate materials having very close boiling points in order to obtain high product purities. This may be done as those skilled in the art well know, by superfractionation means. However, in operating the superfractionating columns, it is necessary to maintain close control over the several process variables in order to obtain high and constant product purities.

In the alkylation of the $C_4$ hydrocarbons, the conversion reaction is far from complete per pass of feedstock. Consequently, reactant materials are present in the reactor effluent stream. The reactants are separated from the effluent for recycle and reuse usually by fractionation means. Specifically, in the alkylation of $C_4$ hydrocarbons, it is desirable to recover the unreacted isobutane, the n-butane, and the desired alkylate product in as expeditious and economical manner as possible. However, isobutane and n-butane have very close boiling points and the separation thereof by fractionation means requires careful control over the process variables in order to make this situation possible.

Additionally, for economical operation, it is desirable to produce an alkylate product containing sufficient butane for the predetermined vapor pressure of the end product, alkylate. Accordingly, the isostripper columns in modern refinery practice must be designed not only to separate the isobutane from the n-butane, but must also leave sufficient n-butane in the bottom of the tower for this vapor pressure requirement.

Since n-butane is substantially inert to the ordinary alkylation catalyst, its concentration increases in the reactor effluent when the effluent is lower boiling than the alkylate. Accordingly, it is desirable to remove the n-butane from the reaction system in order to prevent its buildup therein.

Therefore, it is an object of this invention to provide a method for separating light hydrocarbon components from a hydrocarbon feed mixture comprising $C_3$ hydrocarbons, isobutane, n-butane, and alkylate.

It is another object of this invention to provide a method of controlling the fractionation of an isostripper column processing the reactor effluent from a $C_4$ alkylation conversion unit.

It is a specific object of this invention to provide a method for separating isobutane from n-butane in a more facile and economical manner.

These and other objects of this invention will be apparent from the following description which, taken with the attached drawing, forms a part of this disclosure.

According to this invention, a method for separating a hydrocarbon feed mixture containing $C_3$ hydrocarbons, isobutane, n-butane, and alkylate, by fractionation means comprises (a) introducing said mixture into the upper section of a multiple-deck fractionating column operating under fractionation conditions; (b) removing an overhead stream comprising $C_3$ hydrocarbons and isobutane; (c) removing a sidecut stream comprising n-butane; (d) removing a bottoms stream comprising alkylate containing sufficient n-butane to produce a predetermined vapor pressure alkylate; (e) measuring a temperature difference in said column between an upper deck level having liquid thereon containing les than 0.1% molar $C_3$ hydrocarbon, and a lower deck level having liquid thereon comprising a molar ratio of isobutane to n-butane of less than 2.0 and greater than 0.5; (f) passing said sidecut stream into a sidecut stripper column under conditions sufficient to produce an overhead vapor stream, at a rate responsive to said measured temperature difference of Step (e), comprising n-butane and a bottoms stream comprising hydrocarbons boiling higher than n-butane; (g) analyzing said stripper overhead vapor stream for hydrocarbons boiling higher than n-butane; (h) condensing a portion of said stripper overhead vapor stream and returning the resulting liquid fraction to said stripper as reflux thereon at a rate responsive to said analysis; (i) removing the remaining portion of said stripper overhead stream at a rate responsive to said measured temperature difference of Step (e); and, (j) returning said bottoms stream from Step (f) to said fractionating column at a locus lower than the draw-off deck level for said sidecut stream of Step (c).

Other embodiments of this invention include the returning of the resulting liquid from the overhead of the sidecut stripper by gravity flow to said stripper.

Still other embodiments of this invention include the operation of the sidecut stripper column at a pressure substantially the same as the main fractionator column pressure at the sidecut removal point with the stripper pressure being in direct responsive relationship to said fractionator pressure.

Referring now to the attached drawing, the hydrocarbon effluent from an alkylation reactor, which had been operating, for example, with hydrogen fluoride as the catalyst for the alkylation of isobutane and $C_4$ olefin hydrocarbons, is passed via line 10 into heat exchanger 11 and steam heater 12 for increasing its temperature to the fractionation conditions hereinafter specified. The heated feed stream from line 10 is passed into isostripper fractionating column 13 at a point in the upper section of the column, e.g. above the top deck. Isostripper column 13 is a typical fractionating column having multiple decks therein. Usually the decks will range from 30 to 100 with a conventional example being approximately 60 decks.

The overhead vapors are removed via line 14 and comprise the $C_3$ hydrocarbons which were originally present in the reactor effluent, and isobutane in high concentration. An alkylate product is removed from column 13 via line 15 and passes in heat exchange relationship with the incoming feed in exchanger 11 and passes out of the system at a predetermined vapor pressure. Typically, this vapor pressure is approximately 7 pounds Reid.

A n-butane vapor stream is removed from column 13 via line 16 and passed into butane rectifier tower 17 (sometimes commonly referred to herein as a stripper column) at the bottom thereof. An overhead vapor stream comprising n-butane is removed from column 17 via line 18. Chromatograph 23 continuously analyzes the material in line 18 for hydrocarbons boiling higher than n-butane, e.g. isopentane. The material in line 18 is split into at least two ways with a portion of the vapor being passed via line 20 into overhead condenser 21. The resulting liquid from condenser 21 is passed back into rectifier tower 17 via line 22 through control valve 24 which has been repositioned in response to the analysis by chromatograph 23. Bottoms liquid stream comprising hydrocarbons boiling above n-butane is removed from tower 17 via line 29 and returned directly to isostripper column 13 at a point below the drawoff point of line 16.

Isostripper column 13 is also equipped with a differential temperatures controller 26. The upper temperature probe 27 is located in the column at a locus whereby the liquid at the selected deck level contains less than 0.1% molar $C_3$ hydrocarbons. The bottom temperature probe 28, in similar fashion, is placed in the column at a point whereby the liquid at the selected deck level has a molar ratio of isobutane to n-butane thereon of less than 2.0 and greater than 0.5, preferably about 1.0 such that the temperature of this deck is primarily a function of the isobutane to n-butane ratio on said deck, and for normal fluctuation in feed composition and/or rate the sidecut isobutane to n-butane ratio remains within acceptable limits for a given temperature on said deck.

The differential temperature recorder controller 26 repositions flow control valve 25 for the removal of the n-butane product steam via line 19 from rectifier column 17 hereinabove discussed. Due to the inherent nature of an isotripper, the operation of the upper section of the column immediately below the feed point, e.g., approximately the top ten decks, is commonly referred to, by those skilled in the art, as "pinch-point" operation. An extremely large proportion of the feed to the isostripper and of the overhead therefrom is recycle material; and since the ratio of this recycle material to the net material passing down through the column is quite large, there ensues a relatively high ratio of vapor to liquid load on the docks in the column. The upper temperature probe 27 is located in a position such that with both the high ratio of vapor to liquid load and the pinch-point operation normal operation of the column will provide a steady reference point temperature at this location during normal changes in net isobutane flow down the column.

For a given ratio of vapor to liquid load the pinch point operation ceases to exist as the number of decks increases when proceeding down the column from the feed point to the sidecut vapor draw. Temperature probe 28 is located in a position such that pinch-point operation is not encountered and therefore is responsive to changes in net isobutane flow down the column. As an increased amount of isobutane finds its way down the column, temperature probe 28 will directly pick up a decrease in temperature due to the presence of increase lower boiling isobutane. In turn this causes the $\Delta T$ between the two probes to become less, thereby causing indirectly an increase in the amount of stripping vapors placed into the section of column above the sidecut vapor draw by allowing less sidecut vapor to be drawn, and driving more isobutane overhead and out of the column through line 14 until the column is in balance once again.

It is also noted that with respect to the butane rectifier tower 17, the overhead condenser 21 is placed in such a position that the resulting liquid in the condenser is returned to tower 17 by gravity flow means. The importance of this concept is that in the alkylation reaction small amounts of the acid catalyst are entrained in the light hydrocarbons. To avoid a leakage of the butane stream containing catalyst, it is desirable to minimize the number of pumps, valves and flanges in the system. Thus, the elimination of a reflux pump on butane rectifier tower 17 is a highly desirable safety feature.

Another advantage of the present system is that the normal butane product in line 19 is a vapor steam and is processed through treating means for removal of residual acid as a vapor. Operating in the manner eliminates a separate heater for vaporizing the n-butane from its liquid to vapor state, as is required by the prior art processes. The safety involved in the inventive practice is obvious.

Therefore, the present invention embodies the combination control features of a differential temperature recorder controller operation to control the n-butane product stream from the column and a chromatograph recorder controller which operates to reject $C_5$ and heavier hydrocarbons from the n-butane product. In this manner excellent flexibility of control is achieved over the fractionation system while at the same time allowing extremely high purity products to be obtained therefrom.

As described hereinabove, the differential temperature recorder controller 26 is set so that the upper probe is located in a zone essentially free of $C_3$ hydrocarbons and where the composition remains relatively steady with normal changes in net isobutane and net normal butane flow down the column and the bottom probe is based on a molar ratio of isobutane to n-butane in the liquid at that deck level. Other means of placing these two probes in the isostripper column may be used with satisfactory results. For example, the lower probe may be placed at a point based on a minimum n-butane content of the liquid at that deck level, or it may be based on a minimum isobutane content of the side stream draw vapor in line 16, or it may simply be based on a mechanical separation such that the difference between the upper probe 27 and the lower probe 28 is from 3 to 30 decks, preferably from 10 to 20 decks apart, in order to achieve sufficient response due to temperature differences. Preferably, however, the lower probe is located at its position based on the ratio of isobutane to n-butane in the liquid phase at the selected deck level.

Another advantage to the inventive process is the taking of a vapor sidecut stream via line 16 between isostripper column 13 and butane rectifier tower 17. In this manner, butane rectifier tower 17 operates at the same pressure as the isostripper column thereby eliminating the need for a pressure relief valve on tower 17 which could be activated and cause butane-containing acid to be lost from the system into the atmosphere. The pressure in tower 17 is responsive, of course, to the changes in pressure in isostripper column 13, and operates thereat allowing for the normal pressure drop in the system between the two towers.

As previously mentioned, in column 13, as the differential temperature, measured by temperature probes 27 and 28, increases, the signal generated by recorder controller 26 repositions control valve 25 such that more n-butane product is taken from the system. As more n-butane is removed, the actual temperature measured by probe 28 will decrease thereby causing the differential temperature to decrease. If the $\Delta T$ control point is exceeded, thereby causing too low a $\Delta T$ to be recorded, recorder controller 26 again repositions control valve 25 thereby decreasing the amount of n-butane removed from the system. In similar manner, the temperature measured at point 28 will increase thereby increasing the $\Delta T$ measure. By this control mechanism of measuring two temperature points and using the differential therebetween to control the n-butane product, excellent flexibility of control over the fractionation is achieved.

The success of this operation, of course, depends upon there being a relatively stable supply both in quantity and composition of the $C_5+$ alkylate product. Naturally, since the isostripper column is operating without reflux on an overhead feed system, the alkylate falls steadily and directly from, for example, tray 1 through tray 60 acting as its own internal reflux. Of course, variations in the alkylate quantity and quality from a composition standpoint will vary the set points desired by recorder controller 26. It is a complicated mechanism and in some cases, therefore, the location of the two probes 27 and 28 may best be set on a tray-by-tray calculation indicating the composition of the various liquids on the trays so that suitable response may be obtained to temperature changes at a specific point in the column. Those skilled in the art, from the teachings presented herein, will know how to conduct suitable calculations and experiments in order to locate the two probe points in question.

Chromatograph recorder controller 23 is a conventional apparatus readily obtainable from supply houses. In similar manner, differential temperature controller 26 is a conventional piece of apparatus readily available from supply houses.

The following is a specific example of operation according to the present invention as described above in connection with the attached drawing.

*Example*

A conventional $C_4$ alkylation unit was run using HF as the catalyst and conditions including Isobutane to olefin mol ratio _____ 13
Reactor temperature, °F. _____ 100
HF to hydrocarbon volume ratio _____ 1.0

The effluent from the reactor settler at a rate of 54,600 b.p.s.d. was passed through heat exchange to raise its temperature from 100° F. to 150° F. at which temperature the effluent was passed into the top section (above Tray No. 1) of an isostripper column having 60 fractionating decks therein.

The column was operated with a top pressure of 150 p.s.i.g. and a bottoms pressure of 160 p.s.i.g. Approximately 4,740 b.p.s.d. of alkylate product was removed from the column at a temperature of 380° F.

The column was equipped with a differential temperature probe and a sidecut stripping tower. The upper temperature probe was installed at deck level 10 and the bottom probe was installed at deck level 34.

A sidecut stream comprising n-butane was removed at deck level 51 as a vapor at a temperature of 195° F., and passed into the stripper tower. A net n-butane product was removed overhead as a vapor product at a temperature of 185° F. in response to flow control activated by the differential temperature controller. The controller was set for a ΔT of approximately 10° F. representing a n-butane product purity of 95%.

A chromatograph recorder-controller was installed on the total stripper tower overhead vapor line. This instrument analyzed the overhead stream for material boiling in excess of n-butane such as the pentanes. The chromatograph controlled the amount of reflux returned to the tower.

The combination of chromatograph and differential temperature controls effected substantially pure n-butane, isobutane, and alkylate product streams. Typically, the n-butane product was 95% n-butane, 3% isobutane, and 2% isopentane.

A bottoms stream from the sidecut stripper tower was returned as a liquid to the main column at a temperature of 185° F. and at a locus about deck level 51 (below the sidecut draw-off level). No external heat was used to operate the stripper tower and the overhead condenser was located above the tower so that any liquid returned as reflux could flow by gravity.

The liquid on deck number 10 contained less than 0.1% molar $C_3$ hydrocarbons and the liquid on deck number 34 contained less than 1.0 molar ratio of isobutane to n-butane, e.g. 0.60.

The following table summarizes the hydrocarbon material balance around the new system:

HYDROCARBON MATERIAL BALANCE, MOLS PER HOUR

|  | Column Feed | Alkylate Product | Sidecut Vapor | Tower Bottom | Butane Product | Reflux to Tower | Column Overhead |
|---|---|---|---|---|---|---|---|
| Line No____ | 10 | 15 | 16 | 29 | 19 | 22 | 14 |
| $C_2$_____ | 1.39 |  |  |  |  |  | 1.39 |
| $C_3$_____ | 928.34 |  |  |  |  |  | 928.34 |
| $iC_4$_____ | 4,770.28 | 0.46 | 14.37 | 4.75 | 9.62 | 14.42 | 4,760.20 |
| $nC_4$_____ | 1,488.14 | 40.78 | 647.94 | 383.53 | 264.41 | 396.30 | 1,182.95 |
| $iC_5$_____ | 53.76 | 35.66 | 12.54 | 11.44 | 1.10 | 1.65 | 17.00 |
| $C_6+$_____ | 412.89 | 389.09 | 3.11 | 3.11 |  |  | 23.80 |
| Total___ | 7,654.80 | 465.99 | 677.96 | 402.83 | 265.13 | 412.37 | 6,913.68 |

What is claimed is:

1. Method for separating a hydrocarbon feed mixture containing $C_3$ hydrocarbons, isobutane, n-butane, and alkylate by fractionation means comprising
    (a) introducing said feed mixture into the upper section of a multiple-deck fractionating column operating under fractionation conditions;
    (b) removing an overhead stream comprising $C_3$ hydrocarbons and isobutane;
    (c) removing a sidecut stream comprising n-butane;
    (d) removing a bottoms stream comprising alkylate containing sufficient n-butane to produce a predetermined vapor pressure alkylate;
    (e) measuring a temperature difference in said column between an upper deck level having liquid thereon containing less than 0.1% molar $C_3$ hydrocarbon and a lower deck level having liquid thereon comprising a molar ratio of isobutane to n-butane of less than 2.0 and greater than 0.5;
    (f) passing said sidecut stream into a sidecut stripper column under conditions sufficient to produce an overhead vapor stream comprising n-butane and a bottoms stream comprising hydrocarbons boiling higher than n-butane;
    (g) analyzing said stripper overhead vapor stream for hydrocarbons boiling higher than n-butane;
    (h) condensing a portion of said stripper overhead vapor stream and returning the resulting liquid fraction to said stripper as reflux thereon at a rate responsive to said measured composition of Step (g); and,
    (i) returning said bottoms stream from Step (f) to said fractionating column at a locus lower than the drawoff deck level for said sidecut stream of Step (c).

2. Method according to claim 1 wherein said lower deck level has liquid thereon comprising from 1.0 to 0.5 molar ratio of isobutane to n-butane.

3. Method according to claim 2 wherein said condensing in Step (h) is performed in a manner such that the resulting liquid is returned by gravity flow to said stripper.

4. Method according to claim 1 wherein said conditions in Step (f) include a pressure substantially the same as the fractionator column pressure at the sidecut removal point, said stripper pressure being in direct responsive relationship to said fractionator pressure.

5. Method according to claim 4 wherein said sidecut stream in Step (c) comprises vapor.

No references cited.

HERBERT LEVINE, *Primary Examiner.*